(12) United States Patent
Huang et al.

(10) Patent No.: US 11,184,591 B2
(45) Date of Patent: Nov. 23, 2021

(54) PROJECTION DEVICE

(71) Applicants: BENQ CORPORATION, Taipei (TW); BenQ Intelligent Technology (Shanghai) Co., Ltd, Shanghai (CN)

(72) Inventors: Chen-Cheng Huang, Taoyuan (TW); Shuang-Xi Lin, Taipei (TW)

(73) Assignees: BENQ CORPORATION, Taipei (TW); BenQ Intelligent Technology (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 17/145,445

(22) Filed: Jan. 11, 2021

(65) Prior Publication Data
US 2021/0218943 A1    Jul. 15, 2021

(30) Foreign Application Priority Data

Jan. 10, 2020  (CN) .......................... 202010028381.X

(51) Int. Cl.
  *H04N 9/31*  (2006.01)
(52) U.S. Cl.
  CPC ......... *H04N 9/3161* (2013.01); *H04N 9/3152* (2013.01); *H04N 9/3164* (2013.01); *H04N 9/3167* (2013.01)
(58) Field of Classification Search
  CPC .. H04N 9/3164; H04N 9/3167; H04N 9/3161; H04N 9/3152; H04N 9/31

USPC ........ 348/744, 759, 760, 781, 782; 353/7, 8, 353/30, 33, 37, 50, 51, 70, 73; 359/27, 359/437–440, 462, 465, 483.01, 485.01, 359/486.01, 487.01
See application file for complete search history.

(56) References Cited

U.S. PATENT DOCUMENTS

| | | | | |
|---|---|---|---|---|
| 8,177,369 | B2* | 5/2012 | Kaise | H04N 9/3129 353/31 |
| 8,998,421 | B2* | 4/2015 | Akiyama | G03B 21/2073 353/20 |
| 2008/0079855 | A1* | 4/2008 | Komatsu | H04N 9/3129 348/759 |
| 2020/0301265 | A1* | 9/2020 | Yan | H04N 9/3161 |

* cited by examiner

*Primary Examiner* — Sherrie Hsia

(57) ABSTRACT

A projection device includes a projection lens, a first laser light source, a second laser light source and a polarization direction. The first laser light source and the second laser light source respectively emit a first laser light to the projection lens through a laser optical path, wherein the first laser light has a first polarization direction. The polarization direction conversion layer is disposed on the laser optical path and configured to convert the first laser light of the first laser light source into a second laser light, wherein the second laser light has a second polarization direction different from the first polarization direction.

23 Claims, 13 Drawing Sheets

PROJECTION DEVICE

This application claims the benefit of People's Republic of China application Serial No. 202010028381.X, filed Jan. 10, 2020, the subject matter of which is incorporated herein by reference.

BACKGROUND OF THE INVENTION

Field of the Invention

The present disclosure relates to a projection device, and more particularly to projection device including a polarization direction conversion layer.

Description of the Related Art

Laser light emitted by the laser light source of the laser projection device is approximate linear polarized light (herein referred to as "linear polarized light"). The linear polarized light has a technical problem. For example, when several laser light sources emit liner polarized light with the same polarization direction, a light intensity difference between the P-polarized light and the S-polarized light emitted by the several laser light sources is very larger. In a back-end application of a laser projection device, such as the application of 3D glasses, the left and right eyes of the viewer receive P-polarized light and S-polarized light respectively. However, since the light intensity difference between the P-polarized light and the S-polarized light emitted by the conventional laser projection device is much larger, the light intensity received by the left and right eyes of the viewer is different, and it affects the picture quality, such as serious picture color aberration or color shift.

SUMMARY OF THE INVENTION

According to an embodiment of the present invention, a projection device is provided. The projection device includes a projection lens, a first laser light source, a second laser light source and a polarization direction. The first laser light source and the second laser light source respectively emit a first laser light to the projection lens through a laser optical path, wherein the first laser light has a first polarization direction. The polarization direction conversion layer is disposed on the laser optical path and configured to convert the first laser light of the first laser light source into a second laser light, wherein the second laser light has a second polarization direction different from the first polarization direction.

Preferably, the polarization direction conversion layer is a half-wave plate.

Preferably, the projection device further includes a focusing lens, wherein the polarization direction conversion layer is disposed on an optical path between the first laser light source and the focusing lens.

Preferably, the projection device includes a plurality of the first laser light sources, a plurality of the second laser light sources, and a plurality of the polarization direction conversion layers, the first laser light sources and the second light sources are disposed in staggered means (staggeredly disposed), and the polarization direction conversion layer is disposed on the optical path of the first laser light of the corresponding first laser light source.

Preferably, the projection device includes a plurality of the first laser light source and a plurality of the second laser light source, the polarization direction conversion layer has a plurality of through holes, and the through holes correspond to the second laser light sources in position.

Preferably, the number of the first laser light sources is equal to the number of the second laser light sources.

Preferably, the projection device further includes a phosphor wheel comprising a wavelength conversion area and a light transmission area; wherein the polarization direction conversion layer is disposed on the light transmission area of the phosphor wheel.

Preferably, the light transmission area includes an inner edge area and an outer edge area, and the inner edge area is closer to a rotation axis of the phosphor wheel than the outer edge area, and the polarization direction conversion layer is disposed on the inner edge area.

Preferably, the light transmission area has a radial width, a width of the inner edge area is half of the radial width, and a width of the outer edge area is half of the radial width.

Preferably, the polarization direction conversion layer includes a plurality of sub-conversion layers separately disposed, and a total area of the sub-conversion layers is half of area of the light transmission area.

Preferably, the projection device further includes a dichroic mirror; wherein the polarization direction conversion layer is disposed on an optical path between the dichroic mirror and the projection lens.

Preferably, the projection device further includes a color wheel; wherein the polarization direction conversion layer is disposed on the color wheel.

Preferably, the projection device further includes two reflectors disposed on the laser optical path; wherein the polarization direction conversion layer disposed on an optical path between the two reflectors.

Preferably, the projection device further includes a light guide pillar; wherein the polarization direction conversion layer is disposed on an upstream optical path of the light guide pillar.

Preferably, the polarization direction conversion layer is directly disposed on the first laser light source.

Preferably, the polarization direction conversion layer and the first laser light source are spaced apart from each other.

Preferably, the number of the polarization direction conversion layer is only one.

Preferably, the number of the polarization direction conversion layers is plural and are disposed separately from each other.

Preferably, the polarization direction conversion layer and the first laser light source are integrated into one single element.

The above and other aspects of the invention will become better understood with regard to the following detailed description of the preferred but non-limiting embodiment(s). The following description is made with reference to the accompanying drawings.

Figure 1A:
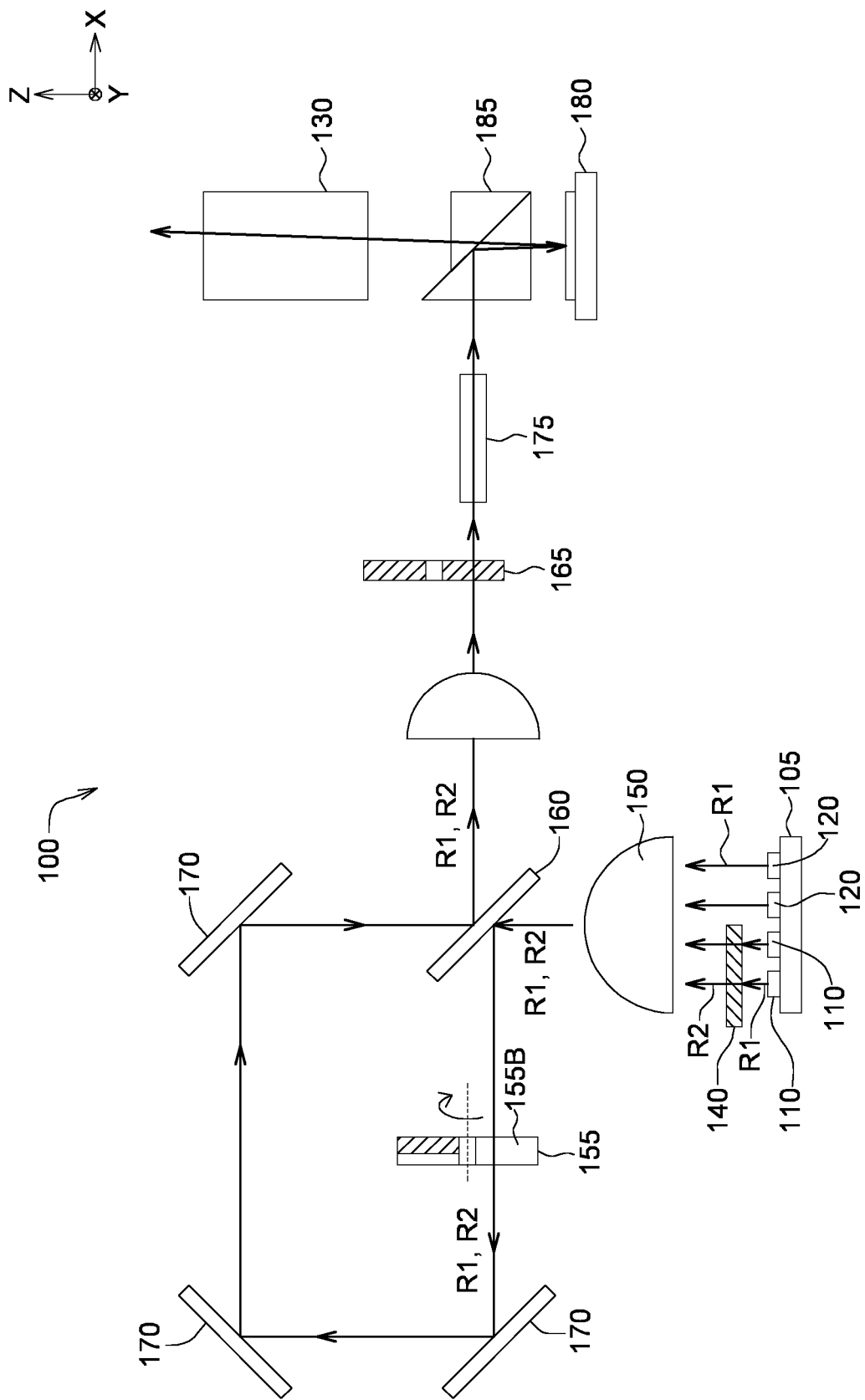
FIGS. 1A and 1B show schematic diagrams of the projection device according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
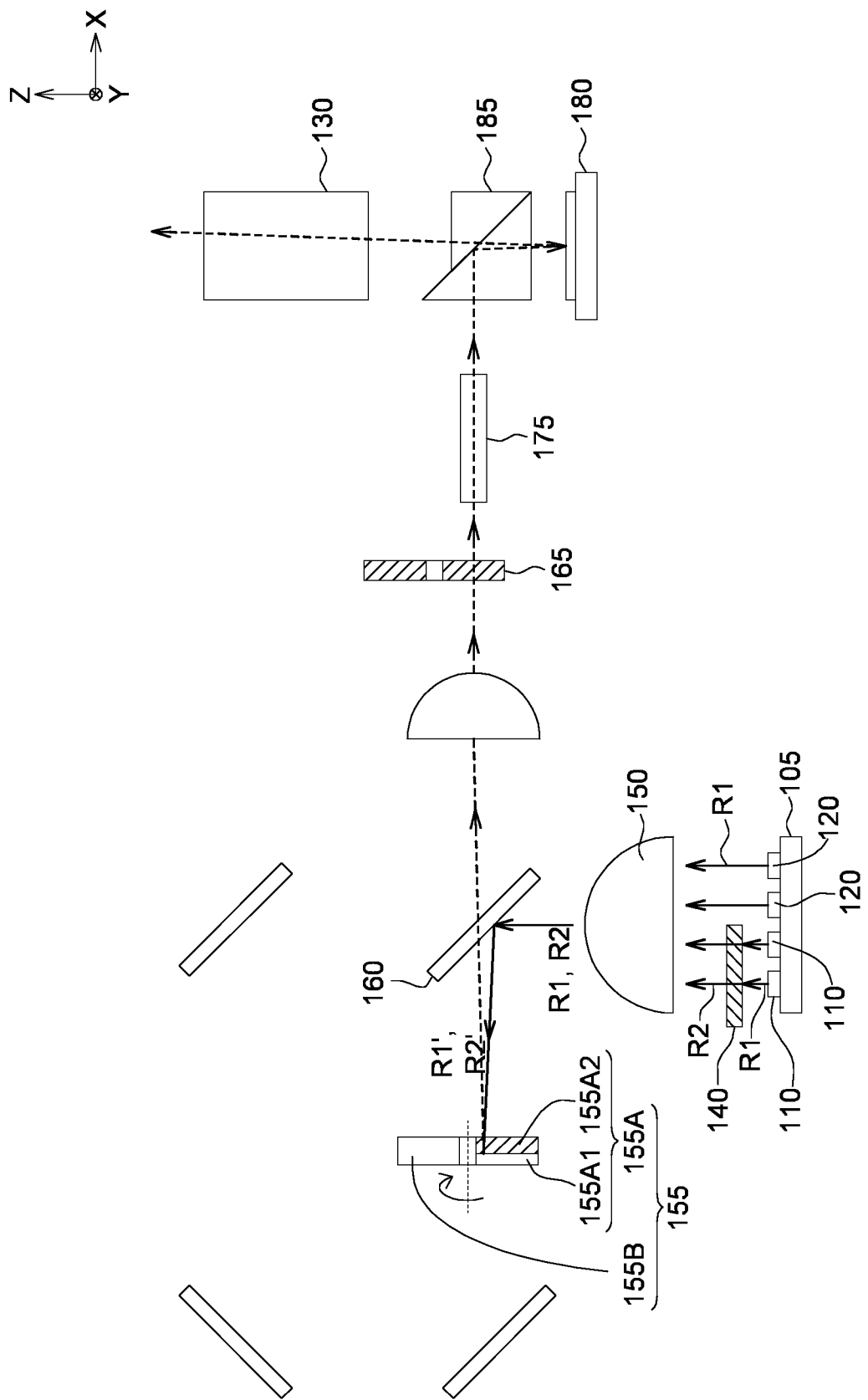
Figure 2:
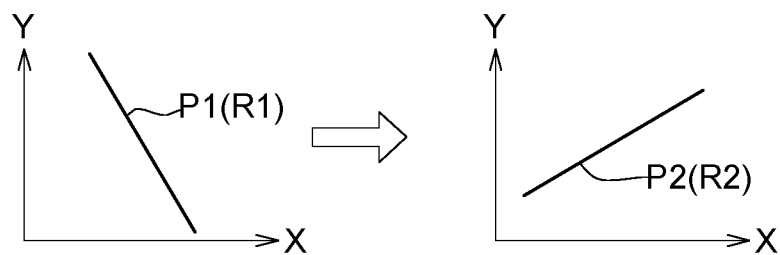
FIG. 2 shows a first polarization direction of first laser light and a second polarization direction of second laser light of FIG. 1A.

Referring to FIGS. 1A, 1B and 2, FIGS. 1A and 1B show schematic diagrams of the projection device 100 according to an embodiment of the present invention, and FIG. 2 shows a first polarization direction P1 (labeled P1(R1)) of first laser light R1 and a second polarization direction P2 (labeled P2(R2)) of second laser light R2 of FIG. 1A. XY plane in figures is, for example, distribution plane of the first laser light source 110 and the second laser light source 120, Z axis is substantially perpendicular to the XY plane, and the Z axis is, for example, an optical axis direction of the laser.

The projection device 100 is, for example, a laser projector, which includes at least one first laser light source 110, at least one second laser light source 120, a projection lens 130, a polarization direction conversion layer 140, a focusing lens 150, a phosphor wheel 155, and a dichroic mirror 160, a color wheel 165, at least one reflector (for example, reflection mirror) 170, a light guide pillar 175, a light valve 180 and a prism 185.

The first laser light source 110 and the second laser light source 120 could be disposed on a circuit board 105. The first laser light source 110, the second laser light source 120 and the circuit board 105 could constitute a light source module. At least one first laser light source 110 and/or at least one second laser light source 120 could be arranged in an array along X axis and/or Y axis, but the embodiment of the present invention is not limited thereto.

The first laser light source 110 and the second laser light source 120 both could emit first laser light R1, such as blue light or light with other light color, but the embodiment of the present invention does not limit the light color of the first laser light R1. The first laser light R1 has the first polarization direction P1 (the first polarization direction P1 is shown in FIG. 2 and is represented by P1(R1)). The first laser light R1 travels through a laser optical path to the projection lens 130. The polarization direction conversion layer 140 is disposed on the laser optical path, and is configured to convert the first laser light R1 of the first laser light source 110 into a second laser light R2. The second laser light R2 has the second polarization direction P2 different from the first polarization direction P1 P2 (the second polarization direction P2 is shown in FIG. 2 and is represented by P2(R2)). In the present embodiment, the number of the polarization direction conversion layer 140 is only one.

Since the polarization direction conversion layer 140 converts laser light with the first polarization direction P1 in one or a portion of all laser light sources into the second polarization direction P2, the second laser light R2 that has traveled through the polarization direction conversion layer 140 and the first laser light R1 that has not traveled through the polarization direction conversion layer 140 do not have the same polarization direction. As a result, components (for example, the P-polarized light and the S-polarized light), in two perpendicular axes, of the light quantity (or light intensity) of the second laser light R2 traveling through the polarization direction conversion layer 140 and components (for example, the P-polarized light and the S-polarized light), in two perpendicular axes, of the light quantity (or light intensity) of the first laser light R1 not traveling through the polarization direction conversion layer 140 approach (or close to each other) respectively, so that, in the application of 3D glasses, the left and right eyes of the viewer respectively receive the P-polarized light and the S-polarized light which have approaching light intensity.

In an embodiment, as shown in FIG. 2, the second polarization direction P2 of the second laser light R2 is substantially perpendicular to the first polarization direction P1 of the first laser light R1. As a result, the components, in two perpendicular axes, of the light quantity of the second laser light R2 traveling through the polarization direction conversion layer 140 and the components, in two perpendicular axes, of the light quantity of the first laser light R1 not traveling through the polarization direction conversion layer 140 could be substantially equal respectively, so that, in the application of 3D glasses, the left and right eyes of the viewer respectively receive the P-polarized light and S-polarized light which have the same (or approaching) light intensity. As a result, the left and right eyes of the viewer wearing the 3D glasses receive 3D picture with excellent quality.

In addition, the number of the first laser light sources 110 and the number of the second laser light sources 120 could be the same or different. When the number of the first laser light source 110 is the same as the number of the second laser light source 120, the light quantity of the first laser light R1 and the light quantity of the second laser light R2 traveling through the polarization direction conversion layer 140 are substantially equal, so that the left and right eyes of the viewer wearing 3D glasses respectively receive the P-polarized light and S-polarized light which have the approaching light quantity.

In an embodiment, the polarization direction conversion layer 140 is, for example, a half-wave plate, which could convert the first polarization direction P1 of the laser light traveling therethrough (travels through the polarization direction conversion layer 140) into a second polarization direction P2 perpendicular to the first polarization direction P1. However, the embodiment of the present invention is not limited to this. As long as the first polarization direction P1 of the laser light travels through the polarization direction conversion layer 140 could be converted into the second polarization direction P2 perpendicular to the first polarization direction P1, the polarization direction conversion layer 140 could also be other type of optical component. In addition, the polarization direction conversion layer 140 could change the polarization direction of the laser light traveling therethrough, but does not change the wavelength of the laser light traveling therethrough.

Figure 3:
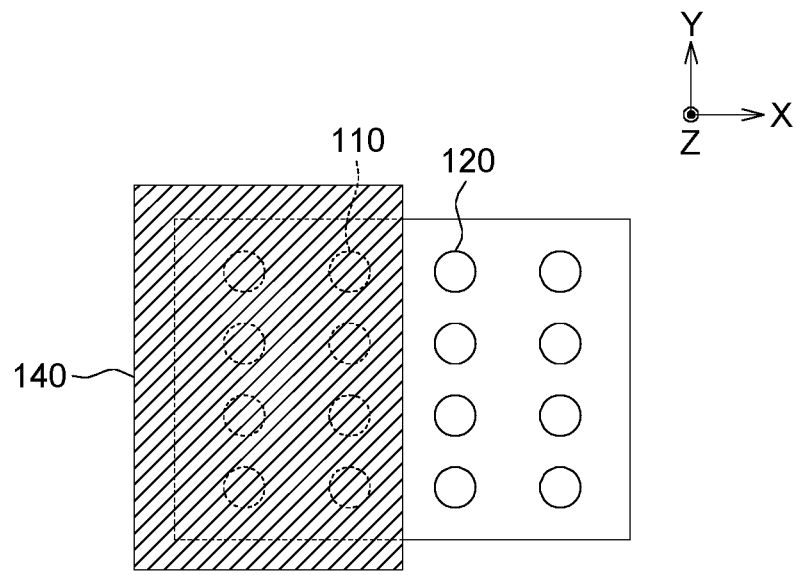
FIG. 3 shows a schematic diagram of the configuration of the first laser light source, the second laser light source and the polarization direction conversion layer of FIG. 1A.

Referring to FIGS. 1A and 3, FIG. 3 shows a schematic diagram of the configuration of the first laser light source 110, the second laser light source 120 and the polarization direction conversion layer 140 of FIG. 1A. In the present embodiment, the polarization direction conversion layer 140 could be disposed on the optical path between the first laser light source 110 and the focusing lens 150. As shown in FIG. 3, the polarization direction conversion layer 140 is, for example, a continuously extending structure, which covers the entire distribution area of the first laser light source 110, so that the first laser light R1 emitted by each first laser light source 110 could travel through the polarization direction conversion layer 140.

As shown in FIGS. 1A and 1B, the phosphor wheel 155 includes a wavelength conversion area 155A and a light transmission area 155B. The wavelength conversion area 155A includes a reflection layer 155A1 and a wavelength conversion layer 155A2, wherein the wavelength conversion layer 155A2 is formed on the reflection layer 155A1. The wavelength conversion layer 155A2 includes, for example, a number of fluorescent particles, which could convert the wavelength of the first laser light R1 and the wavelength of the second laser light R2 into other wavelengths to change the light color of the first laser light R1 and the light color of the second laser light R2. For example, the wavelength conversion layer 155A2 could convert blue light into yellow light.

The phosphor wheel 155 could continue to rotate, such that the wavelength conversion area 155A is aligned with the optical path of the first laser light R1 and the second laser light R2, or the light transmission area 155B is aligned with the optical path of the first laser light R1 and the second laser light R2.

As shown in FIG. 1B, when the phosphor wheel 155 rotates to the wavelength conversion area 155A to align with the optical path of the first laser light R1 and the second laser light R2, the laser optical path of the first laser light R1 and the second laser light R2 from the light source to the projection lens 130 sequentially travels through: the polarization direction conversion layer 140, the focusing lens 150, the dichroic mirror 160, the phosphor wheel 155, the dichroic mirror 160, the color wheel 165, the light guide pillar 175, the prism 185 and the light valve 180.

When the phosphor wheel 155 rotates to a position where the wavelength conversion area 155A is aligned with the optical path of the first laser light R1 and the second laser light R2, the first laser light R1 and the second laser light R2 travels through the wavelength conversion layer 155A2 to change as the wavelength of the first laser light R1' and the wavelength of the second laser light R2', wherein the wavelength of the first laser light R1' is different from the wavelength of the first laser light R1 (for example, light colors are different), and the wavelength of the second laser light R2' is different from the wavelength of the second laser light R2 (for example, light colors are different). In an embodiment, the first laser light R1 and the second laser light R2 are, for example, blue light, and the wavelength of the converted first laser light R1' and second laser light R2' are, for example, yellow light, but the embodiment of the present invention is not limited thereto. Then, the first laser light R1' and the second laser light R2' are reflected to the dichroic mirror 160 from the reflection layer 155A1, and travel to the projection lens 130 through the dichroic mirror 160, the color wheel 165, the light guide pillar 175, the prism 185 and the light valve 180 in sequence and the projection lens 130 for being projected onto an imaging screen (not shown).

As shown in FIG. 1A, when the phosphor wheel 155 rotates to a position where the light transmission area 155B is aligned with the optical path of the first laser light R1 and the second laser light R2, the laser optical path of the first laser light R1 and the second laser light R2 from the light source to the projection lens sequentially travels through: the polarization direction conversion layer 140, the focusing lens 150, the dichroic mirror 160, the phosphor wheel 155, at least one reflector 170, the dichroic mirror 160, the color wheel 165, the light guide pillar 175, the prism 185 and light valve 180.

When the phosphor wheel 155 rotates to a position wherein the light transmission area 155B is aligned with the optical path of the first laser light R1 and the second laser light R2, the first laser light R1 and the second laser light R2 travel through the light transmission area 155B to maintain the original wavelength of the first laser light R1 and the original wavelength of the second laser R2. Then, the first laser light R1 and the second laser light R2 that travel through the light transmission area 155B sequentially travel through at least one mirror 170, a dichroic mirror 160, a color wheel 165, a light guide pillar 175, a prism 185, a light valve 180 and the projection lens 130 to be projected onto the imaging screen (not shown).

Although not shown, the color wheel 165 includes at least one light transmission area and at least one wavelength conversion layer, for example. The light transmission area allows the laser to travel through, and the traveling-through laser maintains its original wavelength (for example, light color). In an embodiment, taking the first laser light R1 and the second laser light R2 as blue light, and the first laser light R1' and the second laser light R2' as yellow light as an example, the several transmission areas include blue light transmission area and yellow light transmission area. In the light transmission area, the blue light maintains the original blue light after traveling through the blue light transmission area, and the yellow light maintains the original yellow light after traveling through the yellow light transmission area. The several wavelength conversion layers are, for example, red light conversion layers, green light conversion layers or other light color conversion layers, which could convert the wavelength of the traveling-through laser light into a wavelength of corresponding light color. For example, yellow light travels through the red light conversion layer of the color wheel 165 and then is converted into red light, and yellow light travels through the green light conversion layer of the color wheel 165 and then is converted into green light. However, the converted light color of the color wheel in the embodiment of the present invention is not limited by the above embodiment.

Figure 4A:
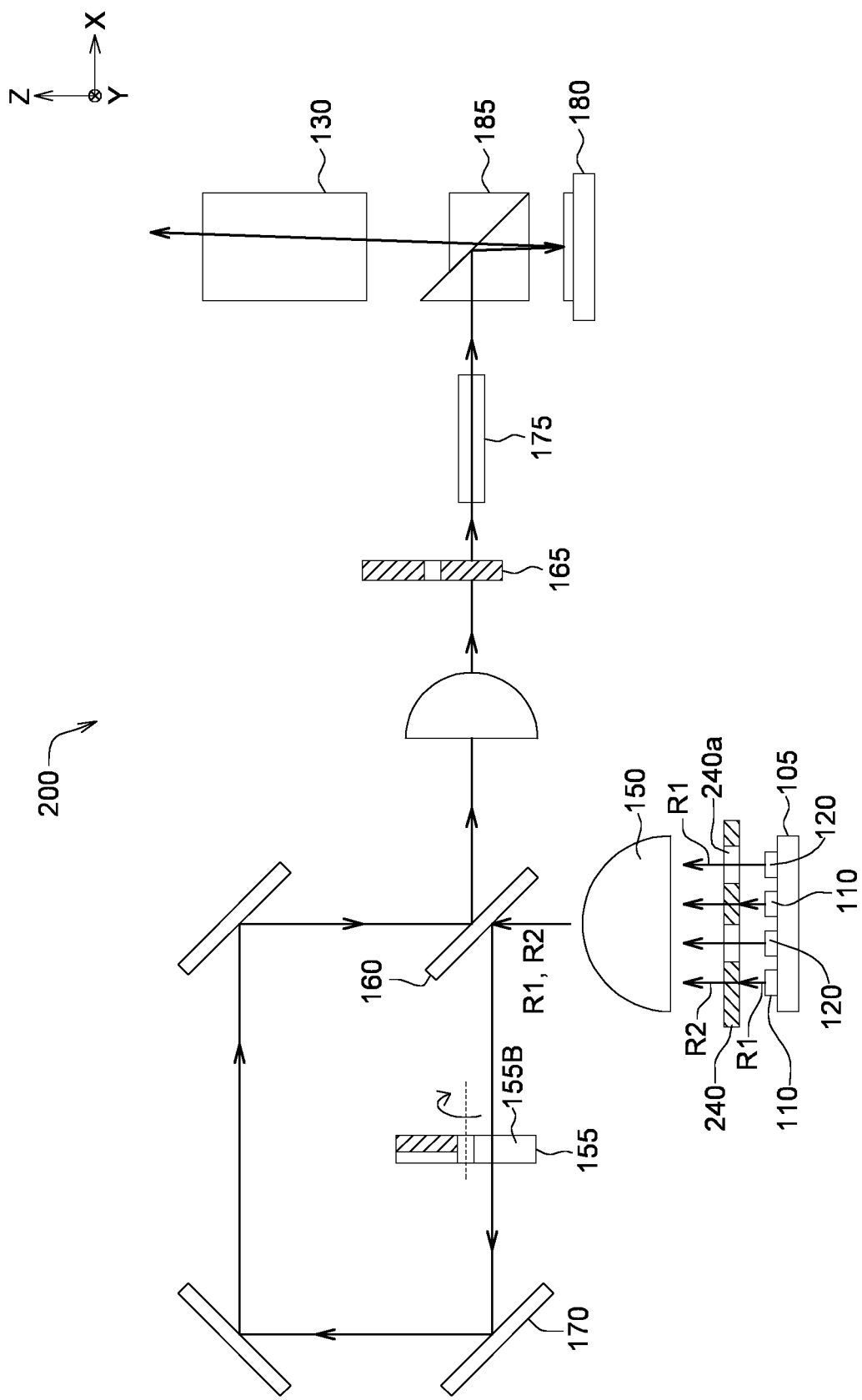
FIG. 4A shows a schematic diagram of a projection device according to another embodiment of the present invention.
Figure 4B:
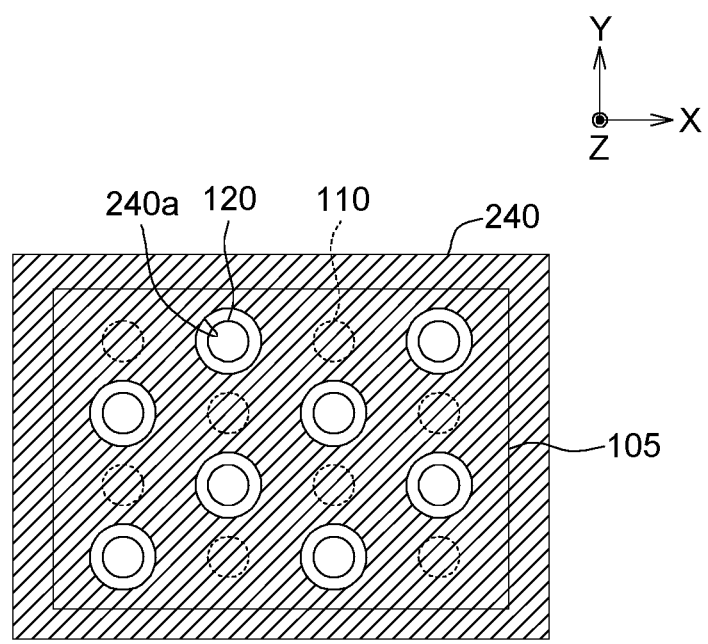
FIG. 4B shows a schematic diagram of the polarization direction conversion layer of FIG. 4A.

Referring to FIGS. 4A and 4B. FIG. 4A shows a schematic diagram of a projection device 200 according to another embodiment of the present invention, and FIG. 4B shows a schematic diagram of the polarization direction conversion layer 240 of FIG. 4A. The projection device 200 is, for example, a laser projector, which includes at least one first laser light source 110, at least one second laser light source 120, the projection lens 130, the polarization direction conversion layer 240, a focusing lens 150, a phosphor wheel 155, and the dichroic mirror. 160, the color wheel 165, at least one reflector 170, the light guide pillar 175, the light valve 180 and the prism 185. The projection device 200 has features the same as or similar to that of the aforementioned projection device 100, except that the structure of the polarization direction conversion layer 240 is different from the polarization direction conversion layer 140.

As shown in FIGS. 4A and 4B, the polarization direction conversion layer 240 has at least one through hole 240a, and the through hole 240a corresponds to the second laser light source 120 in position. As a result, the first laser light R1 emitted by each second laser light source 120 could travel through the through hole 240a for maintaining its original first polarization direction P1. In addition, the physical portion of the polarization direction conversion layer 240 corresponds to the first laser light source 110, so that the original polarization direction P1 is changed to the second polarization direction P2 after the first laser light R1 emitted by each first laser light source 110 travels through the physical portion of the polarization direction conversion layer 240. As a result, the light quantity of the second laser light R2 (having the second polarization direction P2) traveling through the physical portion of the polarization direction conversion layer 240 and the light quantity of the first laser light R1 (having the first polarization direction P1) traveling through the through hole 240a of the polarization direction conversion layer 140 approach (are close), such that the components, in two perpendicular axes, of the light quantity of the second laser light R2 traveling through the physical portion of the polarization direction conversion layer 240 and the components, in two perpendicular axes, of the light quantity of the first laser light R1 traveling through the through hole 240a of the polarization direction conversion layer 140 approach respectively.

In addition, as shown in FIG. 4B, a plurality of first laser light sources 110 and a plurality of second laser light sources 120 could be staggeredly disposed. For example, any two adjacent laser light sources along the X axis or the Y axis are the first laser light source 110 and the second laser light source 120 respectively. As a result, the second laser light R2 traveling through the physical portion of the polarization direction conversion layer 240 and the first laser light R1 traveling through the through hole 240a of the polarization direction conversion layer 140 could be evenly distributed in a downstream optical path of the polarization direction conversion layer 140 (for example, traveling through the optical element or assembly in the downstream optical path). As a result, the components, in two perpendicular axes, of the light quantity of the second laser light R2 traveling through the physical portion of the polarization direction conversion layer 240 and the components, in two perpendicular axes, of the light quantity of the first laser light R1 traveling through the through hole 240a of the polarization direction conversion layer 140 could be more close respectively.

The configuration of the plurality of first laser light sources 110 and the plurality of second laser light sources 120 is not limited to FIG. 4B. In another embodiment, the following three situations may exist simultaneously: (1). The two adjacent laser light sources along the X axis or the Y axis are respectively the first laser light source 110 and the second laser light source 120; (2). the two adjacent laser light sources along the X-axis or Y-axis are both the first laser light sources 110; and (3). the two adjacent laser light sources along the X axis or the Y axis are both the second laser light sources 120.

Figure 5A:
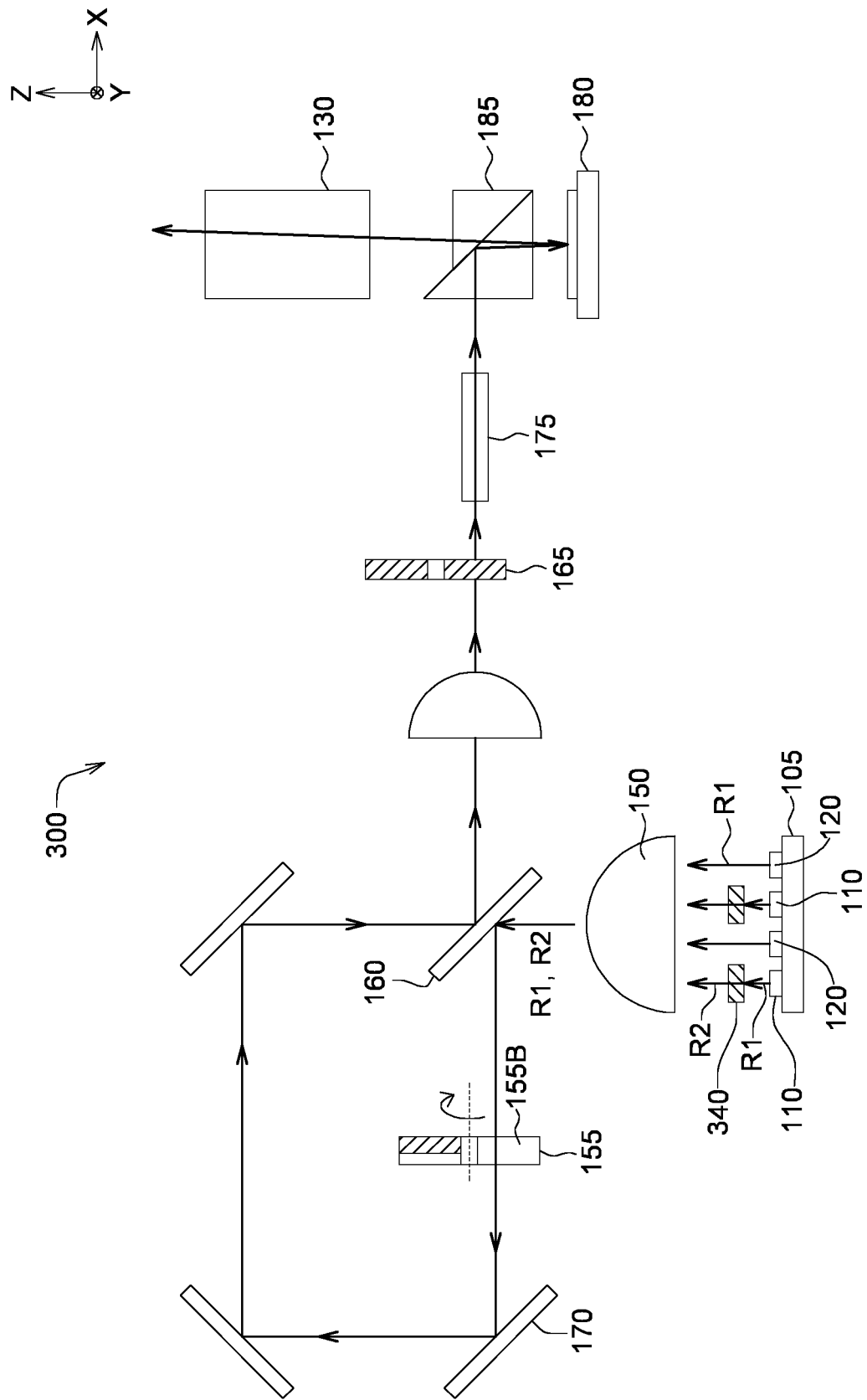
FIG. 5A shows a schematic diagram of a projection device according to another embodiment of the present invention.
Figure 5B:
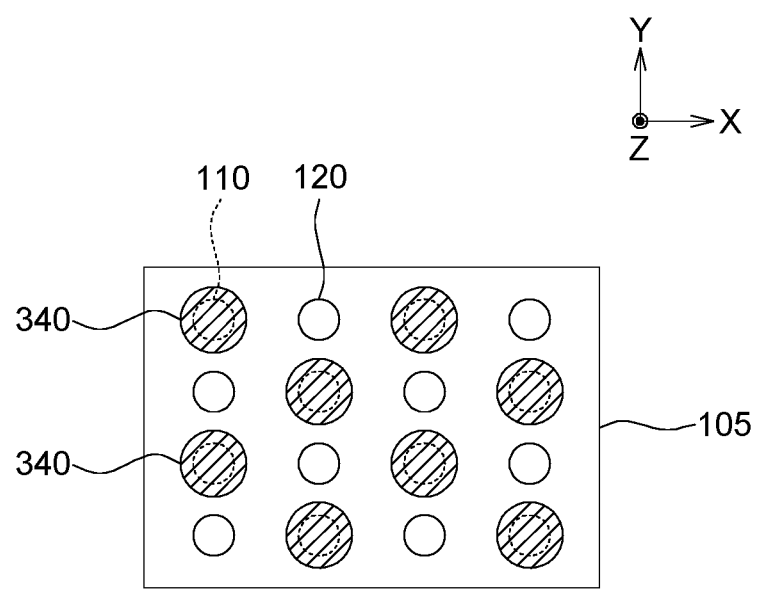
FIG. 5B shows a schematic diagram of the polarization direction conversion layer of FIG. 5A.

Referring to FIGS. 5A and 5B. FIG. 5A shows a schematic diagram of a projection device 300 according to another embodiment of the present invention, and FIG. 5B shows a schematic diagram of the polarization direction conversion layer 340 of FIG. 5A. The projection device 300 is, for example, a laser projector, which includes at least one first laser light source 110, at least one second laser light source 120, the projection lens 130, a polarization direction conversion layer 340, the focusing lens 150, the phosphor wheel 155, and the dichroic mirror. 160, the color wheel 165, at least one reflector 170, the light guide pillar 175, the light valve 180 and the prism 185. The projection device 300 has technical features same as or similar to that of the aforementioned projection device 100, except that the structure of the polarization direction conversion layer 340 is different from the polarization direction conversion layer 140.

The number of the polarization direction conversion layers 340 is plural and are disposed separately from each other. Each polarization direction conversion layer 340 is disposed on the optical path of the first laser light R1 of the corresponding first laser light source 110. As a result, the first polarization direction P1 is changed to the second polarization direction P2 after the first laser light R1 emitted by the first laser light source 110 travels through the polarization direction conversion layer 340. In addition, an interval between two adjacent polarization direction conversion layers 340 corresponds to one second laser light source 120 in position. As a result, the second laser light R2 emitted by each second laser light source 120 could travel through the interval between two adjacent polarization direction conversion layers 340 for maintaining its original first polarization direction P1. As a result, the light quantity of the second laser light R2 (having the second polarization direction P2) traveling through the polarization direction conversion layer 340 and the light quantity of the first laser light R1 (having the first polarization direction P1) not traveling through the polarization direction conversion layer 340 could approach (be close). Therefore, the components, in two perpendicular axes, of the light quantity of the second laser light R2 traveling through the polarization direction conversion layer 340 and the components, in two perpendicular axes, of the light quantity of the first laser light R1 not traveling through the polarization direction conversion layer 340 approach respectively.

In addition, in the foregoing embodiment, the polarization direction conversion layer and the first laser light source 120 are spaced apart from each other, that is, the polarization direction conversion layer 140 and the first laser light source 120 are two independent (or individual) components. However, in another embodiment, the polarization direction conversion layer could be directly disposed on the first laser light source 120, that is, the polarization direction conversion layer and the first laser light source 120 could be integrated into one single element.

The polarization direction conversion layer of the foregoing embodiment is described by taking the optical path being disposed between the light source and the focusing lens 150 as an example, but the embodiment of the present invention is not limited thereto. The polarization direction conversion layer could also be disposed on the phosphor wheel 155, and it will be described below with reference to FIGS. 6A and 6B.

Figure 6A:
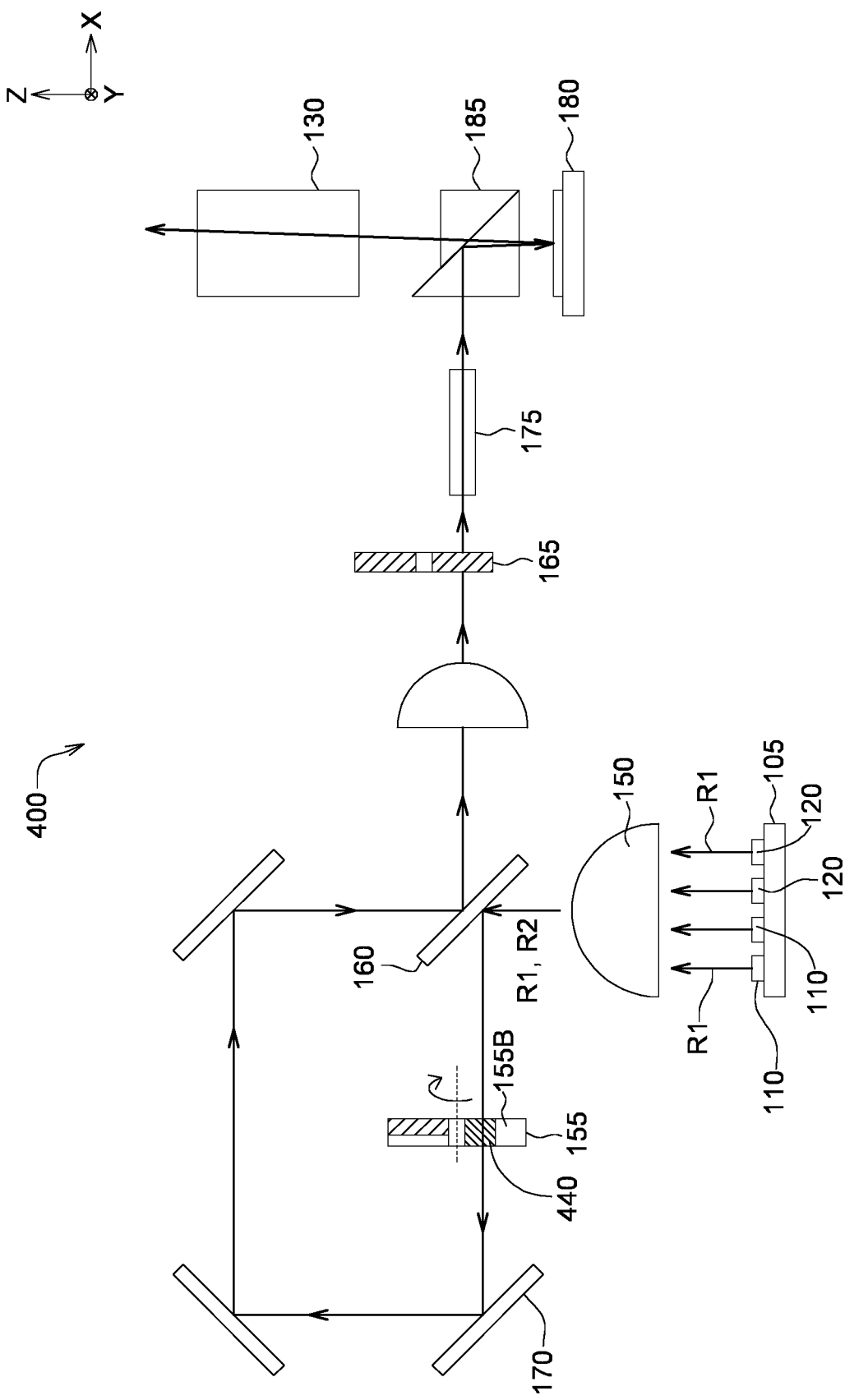
FIG. 6A shows a schematic diagram of a projection device according to another embodiment of the present invention.
Figure 6B:
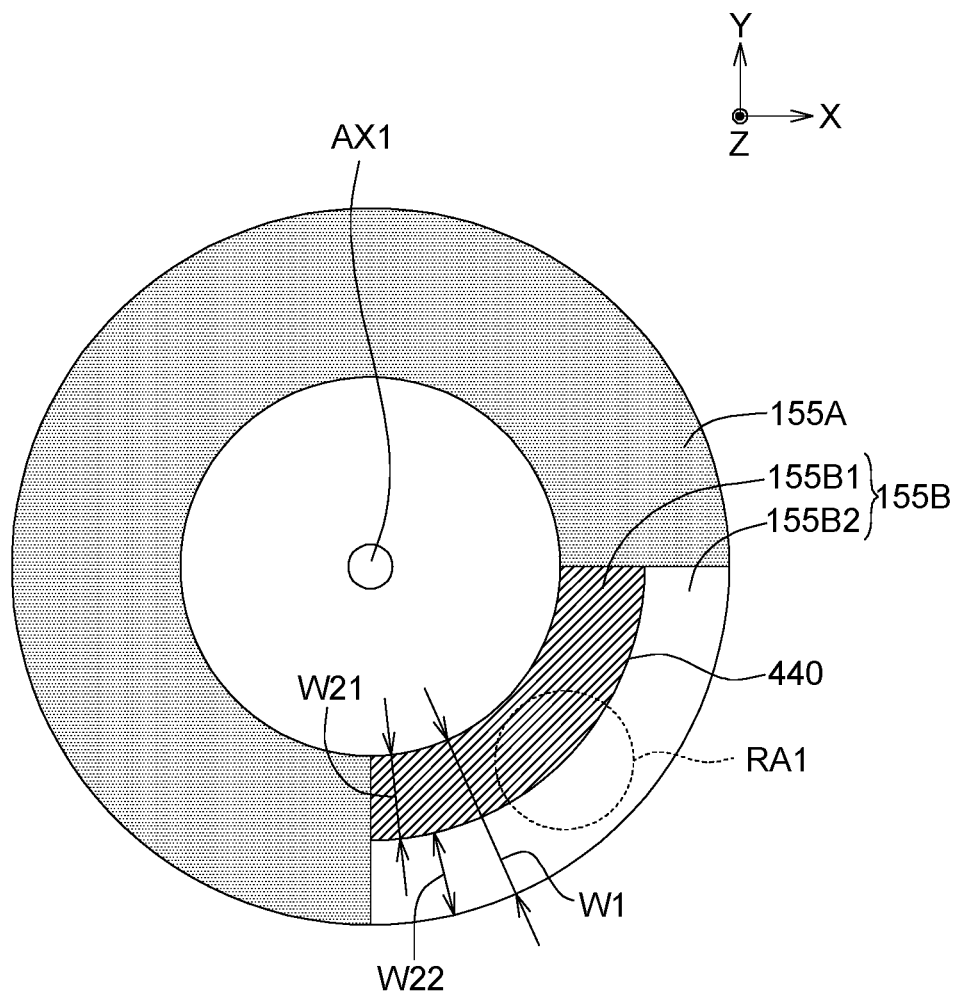
FIG. 6B shows a schematic diagram of the polarization direction conversion layer of FIG. 6A.

Referring to FIGS. 6A and 6B. FIG. 6A shows a schematic diagram of a projection device 400 according to another embodiment of the present invention, and FIG. 6B shows a schematic diagram of the polarization direction conversion layer 440 of FIG. 6A. The projection device 400 is, for example, a laser projector, which includes at least one first laser light source 110, at least one second laser light source 120, the projection lens 130, a polarization direction conversion layer 440, the focusing lens 150, the phosphor wheel 155, and the dichroic mirror. 160, the color wheel 165, at least one reflector 170, the light guide pillar 175, the light valve 180 and the prism 185. The projection device 400 has technical features the same as or similar to that of the aforementioned projection device 100, except that the polarization direction conversion layer 440 and the polarization direction conversion layer 140 are different in the configuration position.

As shown in FIG. 6A, the polarization direction conversion layer 440 could be disposed on the light transmission area 155B of the phosphor wheel 155. As a result, the first laser light R1 could travel through the polarization direction conversion layer 440 located at the light transmission area 155B to convert the first polarization direction P1 of the first laser light R1 into the second polarization direction P2 (that is, the second laser light R2).

As shown in FIG. 6A, the light transmission area 155B includes an inner edge area 155B1 and an outer edge area 155B2. The inner edge area 155B1 is closer to a rotation axis AX1 of the phosphor wheel 155 than the outer edge area 155B2. The polarization direction conversion layer 440 is disposed on the inner edge area 155B1. A distribution area RA1 shown in FIG. 6B represents distribution area of mixed beams of the first laser light R1 and the second laser light R2 traveling through the light transmission area 155B. Although not shown, the light spots of the laser light R1 and the second laser light R2 in the distribution area RA1 overlap each other. The first polarization direction P1 of the first laser light R1 that travel through the polarization direction conversion layer 440 located at the inner edge area 155B1 is converted into the second polarization direction P2 (that is, the second laser light R2), and the first laser light R1 that travels through the outer edge area 155B2 maintains its original first polarization direction P1. In another embodiment, the polarization direction conversion layer 440 could also be disposed on the outer edge area 155B2, which also could produce similar or identical technical effects.

In an embodiment, as shown in FIG. 6A, the light transmission area 155B has a radial width W1, a width W21 of the inner edge area 155B1 is half of the radial width W1, and a width W22 of the outer edge area 155B2 is half of the radial width W1. As a result, the light quantity of the second laser light R2 (having the second polarization direction P2) traveling through the inner edge area 155B1 and the first laser light R1 (having the first polarization direction P1) traveling through the outer edge area 155B2 are approximately equal, and accordingly the components, in two perpendicular axes, of the light quantity of the mixed beam traveling through the light transmission area 155B can be averaged.

Figure 7A:
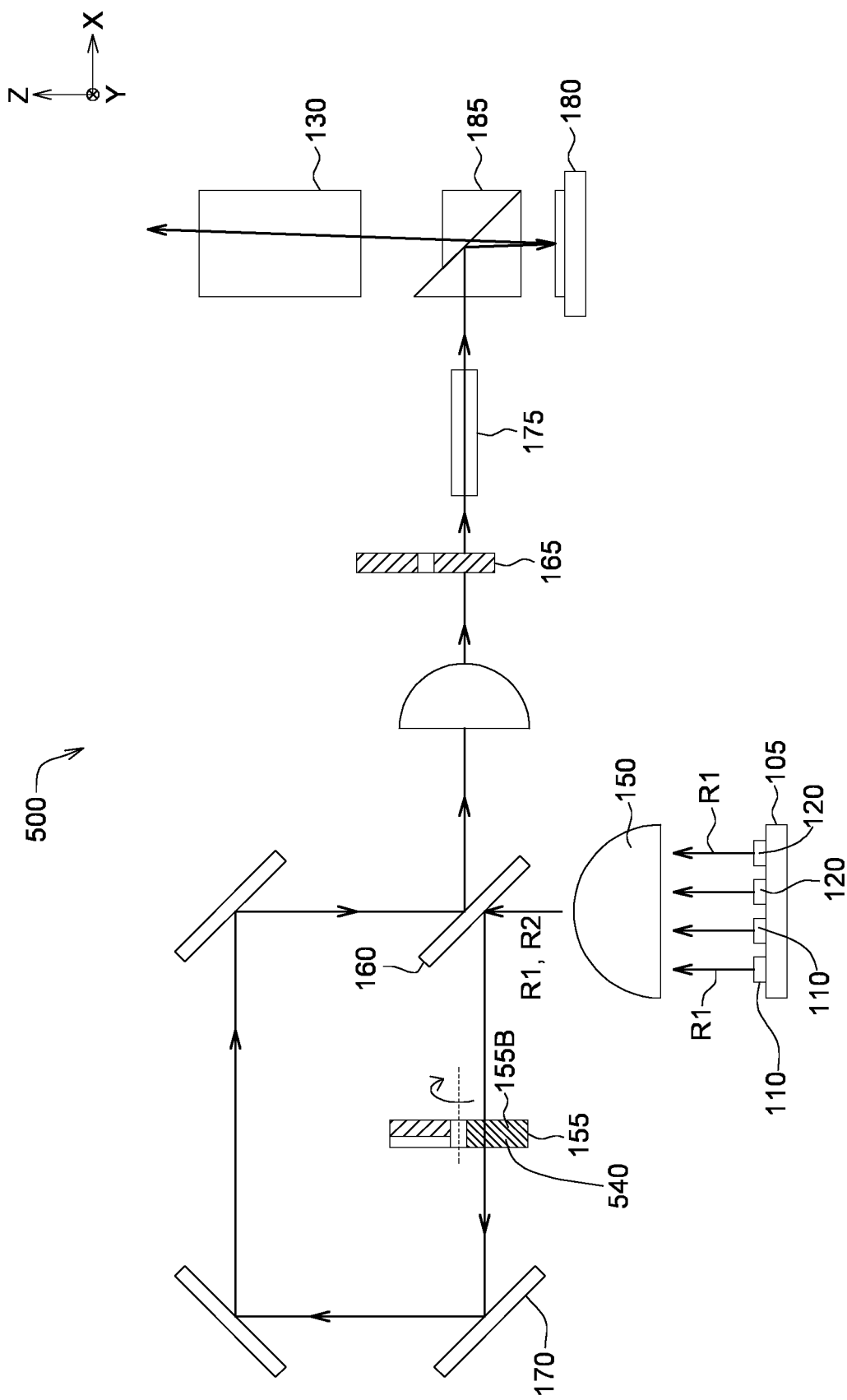
FIG. 7A shows a schematic diagram of a projection device according to another embodiment of the present invention.
Figure 7B:
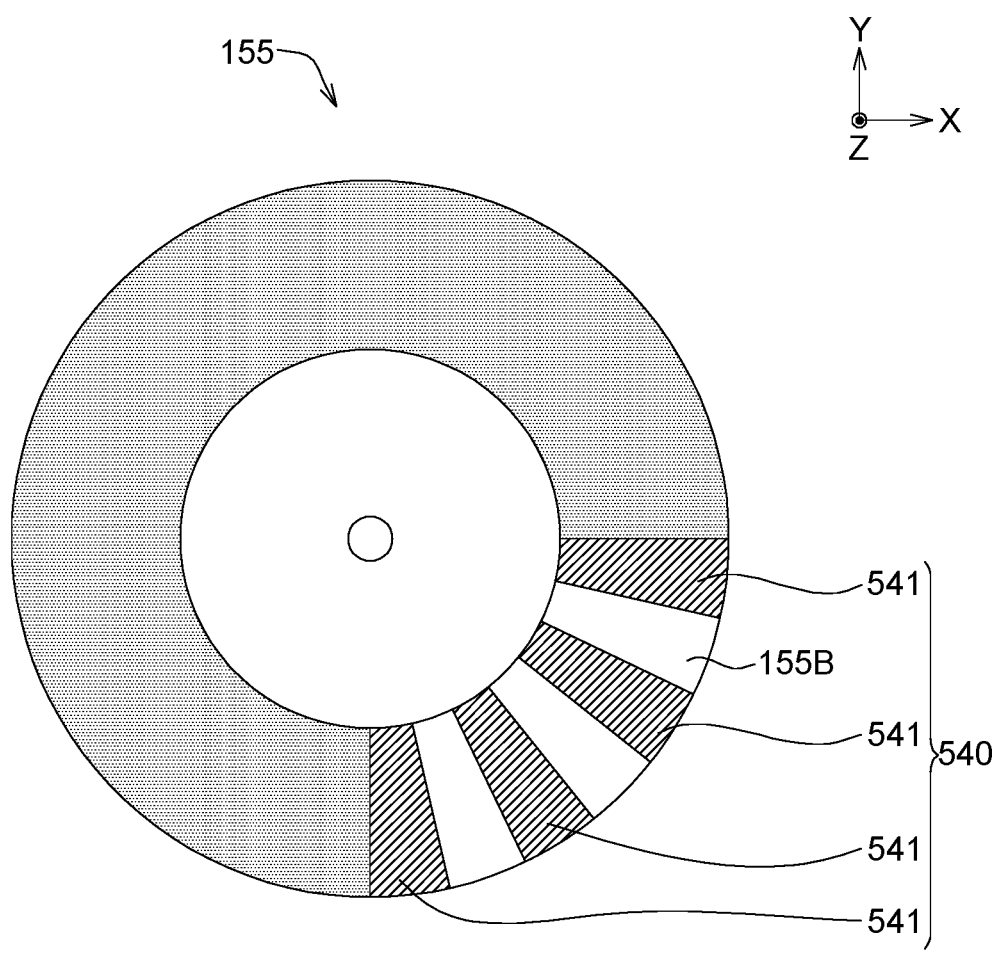
FIG. 7B shows a schematic diagram of the polarization direction conversion layer of FIG. 7A.

Referring to FIGS. 7A and 7B. FIG. 7A shows a schematic diagram of a projection device 500 according to another embodiment of the present invention, and FIG. 7B shows a schematic diagram of the polarization direction conversion layer 540 of FIG. 7A. The projection device 500 is, for example, a laser projector, which includes at least one first laser light source 110, at least one second laser light source 120, the projection lens 130, a polarization direction conversion layer 540, the focusing lens 150, the phosphor wheel 155, and the dichroic mirror. 160, the color wheel 165, at least one reflector 170, the light guide pillar 175, the light valve 180 and the prism 185. The projection device 500 has technical features the same as or similar to that of the aforementioned projection device 400, except that the structure of the polarization direction conversion layer 540 is different from the polarization direction conversion layer 440.

The polarization direction conversion layer 540 could be disposed on the light transmission area 155B of the phosphor wheel 155. The polarization direction conversion layer 540 includes a plurality of sub-conversion layers 541 disposed separately. The sub-conversion layer 541 continuously extends from an inner boundary 155e1 of the light transmission area 155B to an outer boundary 155e2 of the light transmission area 155B. In an embodiment, a total area of the sub-conversion layers 541 is half of the area of the light transmission area 155B. As a result, during the phosphor wheel 155 rotating, the light quantity of the first laser light R1 traveling through the sub-conversion layer 541 is close to the light quantity that does not travel through the sub-conversion layer 541 (that is, directly travel through the light transmission area 155B), and it could average the components of the mixed beam traveling through the light transmission area 155B in two perpendicular axes.

In addition, in other embodiments, the aforementioned polarization direction conversion layer 440 or 540 also could be disposed on the color wheel 165, for example, on the light transmission area of the color wheel 165. The configuration in which the polarization direction conversion layer 440 or 540 is disposed on the color wheel 165 is the same as or similar to the configuration in which the polarization direction conversion layer 440 or 540 is disposed on the phosphor wheel 155, and will not be repeated here.

Figure 8A:
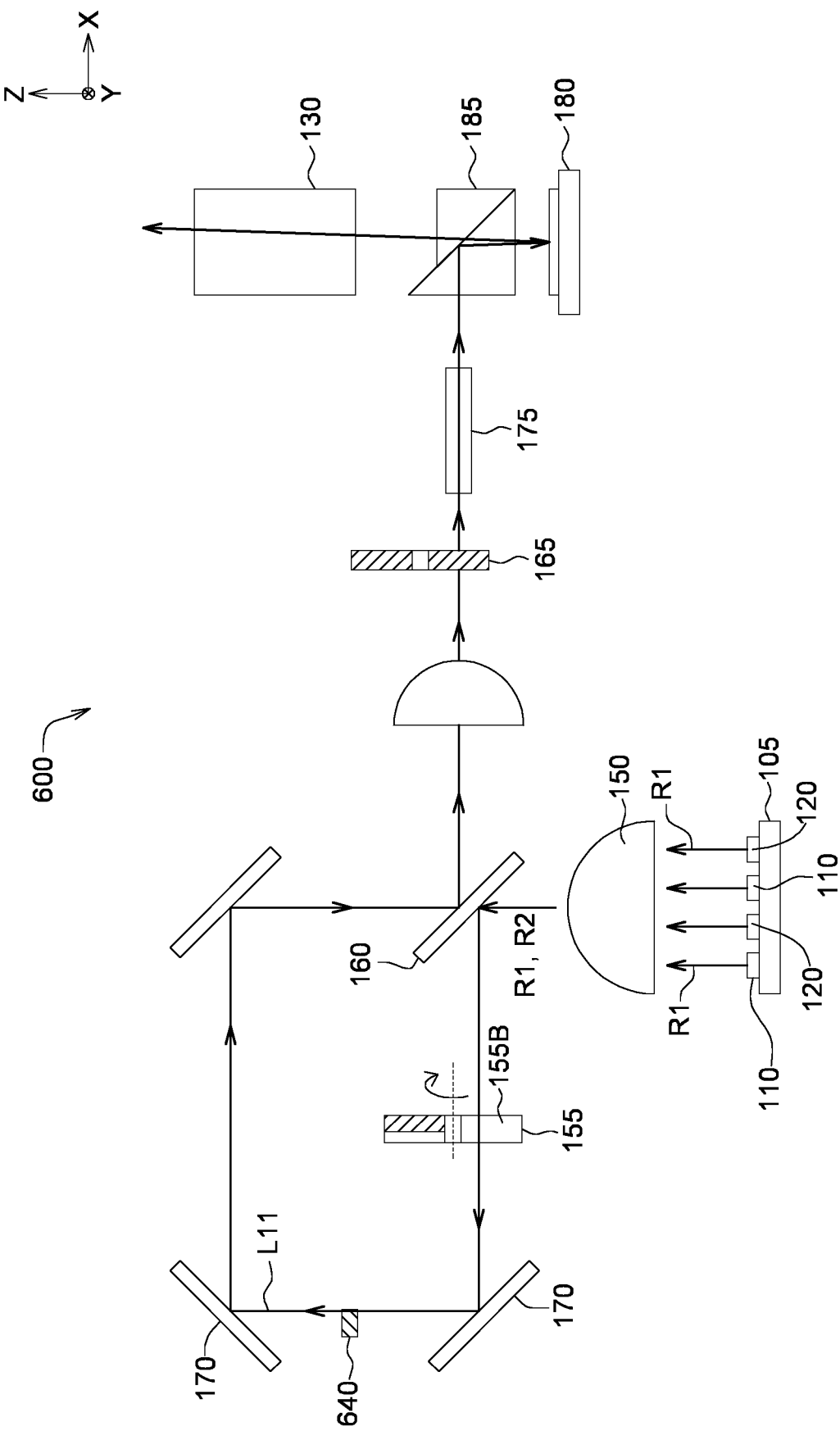
FIG. 8A shows a schematic diagram of a projection device according to another embodiment of the present invention.
Figure 8B:
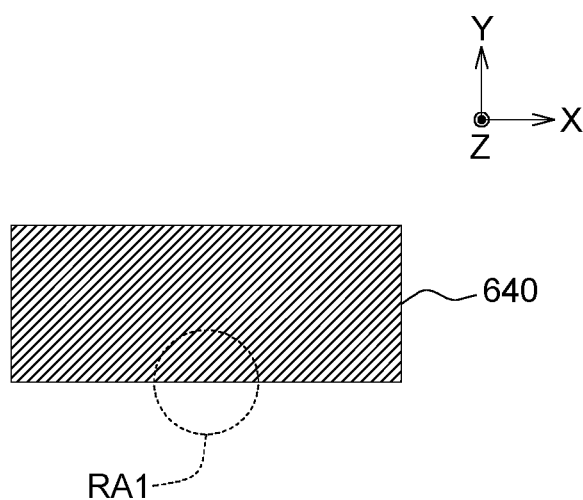
FIG. 8B shows a schematic diagram of the polarization direction conversion layer of FIG. 8A.

Referring to FIGS. 8A and 8B, FIG. 8A shows a schematic diagram of a projection device 600 according to another embodiment of the present invention, and FIG. 8B shows a schematic diagram of the polarization direction conversion layer 640 of FIG. 8A. The projection device 600 is, for example, a laser projector, which includes at least one first laser light source 110, at least one second laser light source 120, the projection lens 130, a polarization direction conversion layer 640, the focusing lens 150, the phosphor wheel 155, and the dichroic mirror. 160, the color wheel 165, at least one reflector 170, the light guide pillar 175, the light valve 180 and a prism 185. The projection device 600 has the technical features the same as or similar to that of the aforementioned projection device 100, except that the arrangement position of the polarization direction conversion layer 640 is different from the arrangement position of the polarization direction conversion layer 140.

The polarization direction conversion layer 640 could be disposed on the optical path L11 between any two reflectors 170. As shown in FIG. 8B, the distribution area RA1 is a distribution area of a mixed beam of several beams of the first laser light R1 and several beams of the second laser light R2. The polarization direction conversion layer 640 is located in the optical path of the distribution area RA1, and a portion of the distribution area RA1 travels through the polarization direction conversion layer 640, and another portion of the distribution area RA1 does not travel through the polarization direction conversion layer 640. As a result, the components of the light quantity of the mixed beam traveling through the distribution area RA1 could approach in two perpendicular axes.

In an embodiment, half of the distribution area RA1 travels through the polarization direction conversion layer 640, and the other half of the distribution area RA1 does not travel through the polarization direction conversion layer 640. As a result, the components of the light quantity of the mixed beam traveling through the distribution area RA1 could be more average in two perpendicular axes.

In another embodiment, the polarization direction conversion layer 640 could be disposed on the optical path between the dichroic mirror 160 and the projection lens 130. For example, the polarization direction conversion layer 640 could be disposed on the optical path between the dichroic mirror 160 and any of the reflectors 170, the optical path between the dichroic mirror 160 and the color wheel 165, or the optical path between the color wheel 165 and the light guide pillar 175.

In summary, the projection device of the embodiment of the present invention includes a polarization direction conversion layer, and the polarization direction conversion layer could change the polarization direction of the laser light traveling therethrough. In an embodiment, the laser light emitted by one or some of all the laser light sources of the projection device travels through the polarization direction conversion layer, while the laser light emitted by another or others of all laser light sources does not travel through the polarization direction conversion layer. As a result, the components, in two perpendicular axes, of the mixed beam of the laser light could approach respectively. In an embodiment, the light quantity of the laser light traveling through the polarization direction conversion layer is substantially the same as the light quantity of the laser light not traveling through the polarization direction conversion layer, and the components, in two perpendicular axes, of the mixed beam of the laser light could be averaged respectively. In an embodiment, the number of the polarization direction conversion layers of the projection device is, for example, one, which could be disposed on any optical path between the laser light source and the projection lens. For example, the polarization direction conversion layers are disposed on the optical path of any two of the laser light source, the focusing lens, the dichroic mirror, at least one reflector, the color wheel, the light guide pillar, the prism, the light valve and the projection lens. Preferably, the polarization direction conversion layer is disposed on the upstream optical path of the light guide pillar, which could simplify the design of the polarization direction conversion layer.

Compared with the prior art, the projection device of the embodiment of the present invention changes the polarization direction of the laser light of a portion of the laser light sources using the polarization direction conversion layer. Due the polarization direction of the light emitted by the laser light source is consistent, the light intensity difference is extremely small, and thus finally the light intensity difference between two polarization directions is small, and the brightness uniformity and the color of the screen (or frame) are easy to control, thereby obtaining better picture (or frame) quality.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection device, comprises:
   a projection lens;
   a first laser light source and a second laser light source respectively emitting a first laser light to the projection lens through a laser optical path, wherein the first laser light has a first polarization direction; and
   a polarization direction conversion layer disposed on the laser optical path and configured to convert the first laser light of the first laser light source into a second laser light, wherein the second laser light has a second polarization direction different from the first polarization direction;
   wherein the first laser light emitted by the second laser light source maintains the first polarization direction after traveling the polarization direction conversion layer.

2. The projection device of claim 1, wherein the polarization direction conversion layer is a half-wave plate.

3. The projection device of claim 1, further comprises:
   a focusing lens;
   wherein the polarization direction conversion layer is disposed on an optical path between the first laser light source and the focusing lens.

4. The projection device according to claim 1, wherein the projection device comprises a plurality of the first laser light sources, a plurality of the second laser light sources, and a plurality of the polarization direction conversion layers, the first laser light sources and the second light sources are staggeredly disposed, and the polarization direction conversion layer is disposed on the optical path of the first laser light of the corresponding first laser light source.

5. The projection device according to claim 4, wherein the number of the first laser light sources is equal to the number of the second laser light sources.

6. The projection device of claim 1, wherein the projection device comprises a plurality of the first laser light source and a plurality of the second laser light source, the polarization direction conversion layer has a plurality of through holes, and the through holes correspond to the second laser light sources in position.

7. The projection device according to claim 6, wherein the number of the first laser light sources is equal to the number of the second laser light sources.

8. The projection device of claim 1, further comprises:
   a phosphor wheel comprising a wavelength conversion area and a light transmission area;
   wherein the polarization direction conversion layer is disposed on the light transmission area of the phosphor wheel.

9. The projection device of claim 8, wherein the light transmission area comprises an inner edge area and an outer edge area, and the inner edge area is closer to a rotation axis of the phosphor wheel than the outer edge area, and the polarization direction conversion layer is disposed on the inner edge area.

10. The projection device according to claim 9, wherein the light transmission area has a radial width, a width of the inner edge area is half of the radial width, and a width of the outer edge area is half of the radial width.

11. The projection device according to claim 8, wherein the polarization direction conversion layer comprises a plurality of sub-conversion layers separately disposed, and a total area of the sub-conversion layers is half of area of the light transmission area.

12. The projection device according to claim 1, further comprises:
   a dichroic mirror;
   wherein the polarization direction conversion layer is disposed on an optical path between the dichroic mirror and the projection lens.

13. The projection device according to claim 1, further comprises:
   a color wheel;
   wherein the polarization direction conversion layer is disposed on the color wheel.

14. The projection device according to claim 1, wherein the projection device further comprises:
   two reflectors disposed on the laser optical path;

wherein the polarization direction conversion layer disposed on an optical path between the two reflectors.

15. The projection device according to claim 1, further comprises:
a light guide pillar;
wherein the polarization direction conversion layer is disposed on an upstream optical path of the light guide pillar.

16. The projection device according to claim 1, wherein the polarization direction conversion layer is directly disposed on the first laser light source.

17. The projection device of claim 1, wherein the polarization direction conversion layer and the first laser light source are spaced apart from each other.

18. The projection device according to claim 1, wherein the number of the polarization direction conversion layer is only one.

19. The projection device according to claim 1, wherein the number of the polarization direction conversion layers is plural and are disposed separately from each other.

20. The projection device according to claim 1, wherein the polarization direction conversion layer and the first laser light source are integrated into one single element.

21. A projection device, comprises:
a projection lens;
a first laser light source and a second laser light source respectively emitting a first laser light to the projection lens through a laser optical path, wherein the first laser light has a first polarization direction; and
a polarization direction conversion layer disposed on the laser optical path and configured to convert the first laser light of the first laser light source into a second laser light, wherein the second laser light has a second polarization direction different from the first polarization direction;
wherein the projection device comprises a plurality of the first laser light source and a plurality of the second laser light source, the polarization direction conversion layer has a plurality of through holes, and the through holes correspond to the second laser light sources in position.

22. A projection device, comprises:
a projection lens;
a first laser light source and a second laser light source respectively emitting a first laser light to the projection lens through a laser optical path, wherein the first laser light has a first polarization direction; and
a polarization direction conversion layer disposed on the laser optical path and configured to convert the first laser light of the first laser light source into a second laser light, wherein the second laser light has a second polarization direction different from the first polarization direction;
wherein the projection device further comprises:
a phosphor wheel comprising a wavelength conversion area and a light transmission area;
wherein the polarization direction conversion layer is disposed on the light transmission area of the phosphor wheel.

23. A projection device, comprises:
a projection lens;
a first laser light source and a second laser light source respectively emitting a first laser light to the projection lens through a laser optical path, wherein the first laser light has a first polarization direction; and
a polarization direction conversion layer disposed on the laser optical path and configured to convert the first laser light of the first laser light source into a second laser light, wherein the second laser light has a second polarization direction different from the first polarization direction;
wherein the projection device further comprises
a color wheel;
wherein the polarization direction conversion layer is disposed on the color wheel; or the projection device further comprises:
a light guide pillar;
wherein the polarization direction conversion layer is disposed on an upstream optical path of the light guide pillar.

* * * * *